Feb. 4, 1936. M. A. WECKERLY 2,029,903
WEIGHING SCALE
Filed July 27, 1932 5 Sheets-Sheet 1
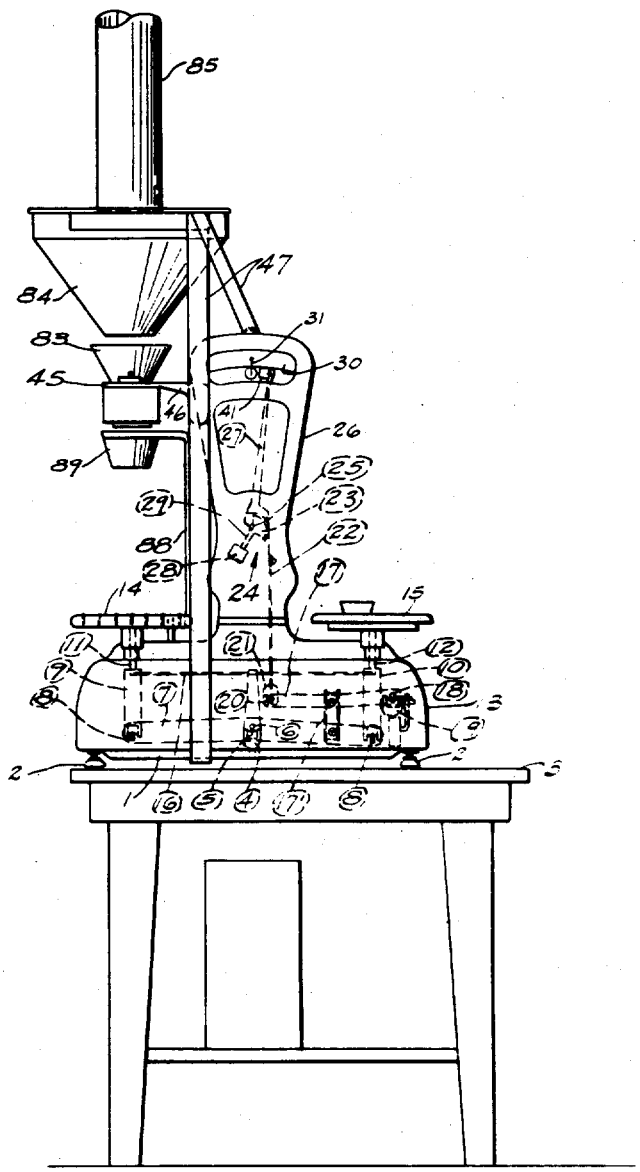
Fig. I.
Mark A. Weckerly
INVENTOR
BY Marshall
ATTORNEY

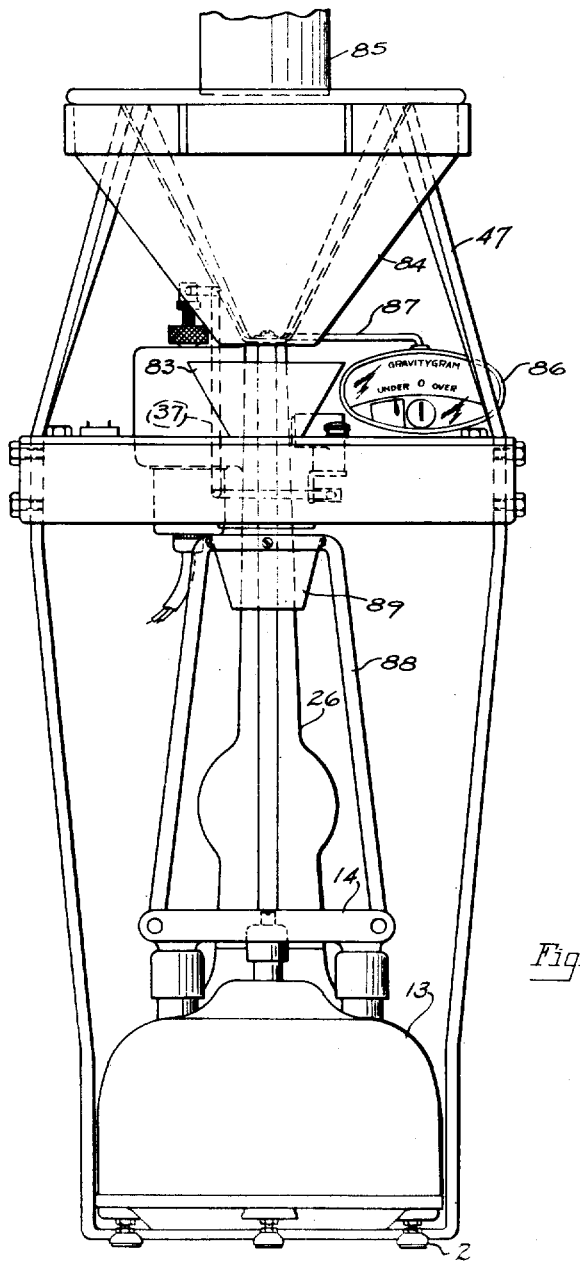
Fig. II

Feb. 4, 1936.  M. A. WECKERLY  2,029,903
WEIGHING SCALE
Filed July 27, 1932  5 Sheets-Sheet 3
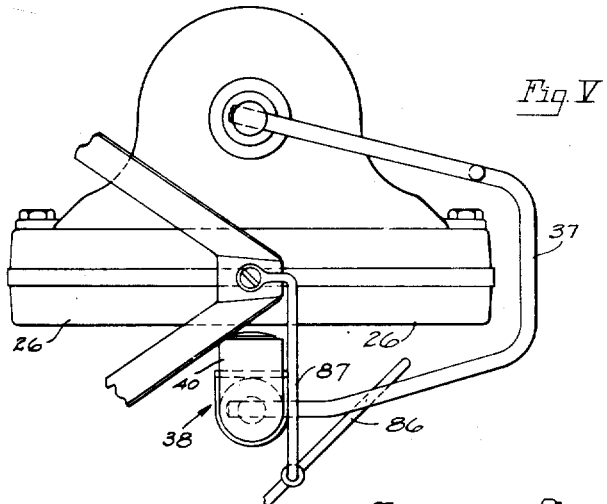
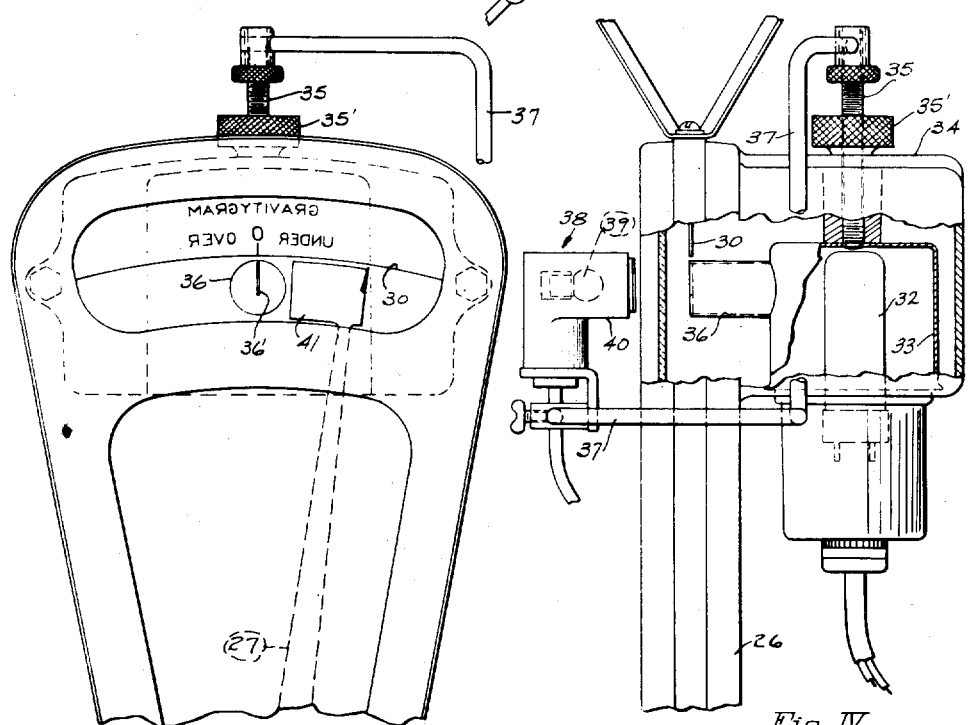
Mark A. Weckerly
INVENTOR Feb. 4, 1936.    M. A. WECKERLY    2,029,903
WEIGHING SCALE
Filed July 27, 1932    5 Sheets-Sheet 4
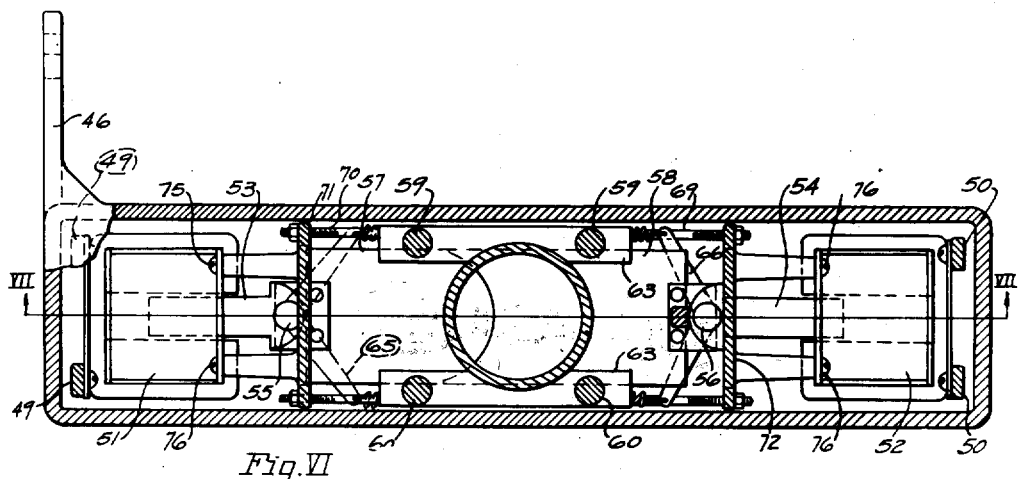
Fig. VI
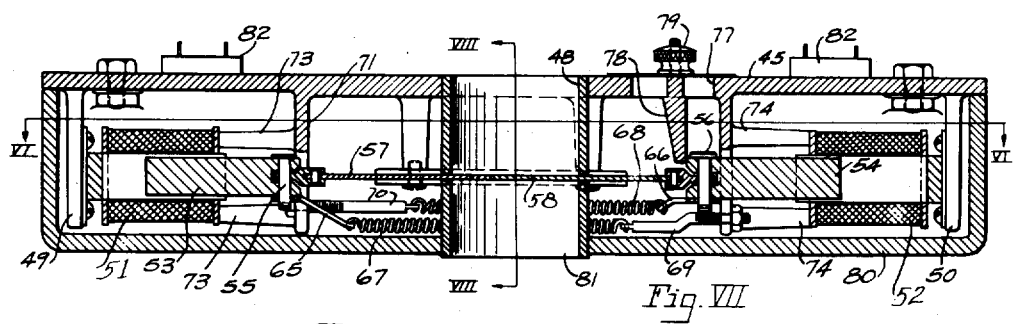
Fig. VII
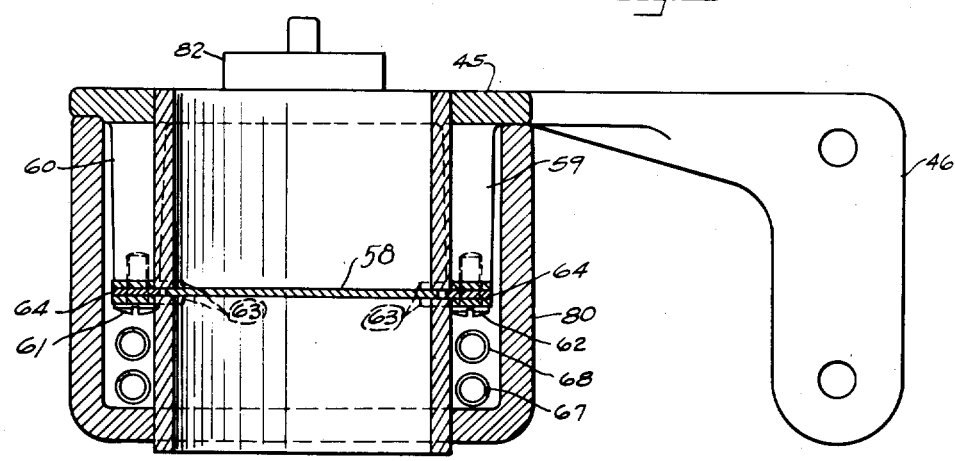
Fig. VIII
Mark A. Weckerly
INVENTOR
BY *CM Marshall*
ATTORNEY

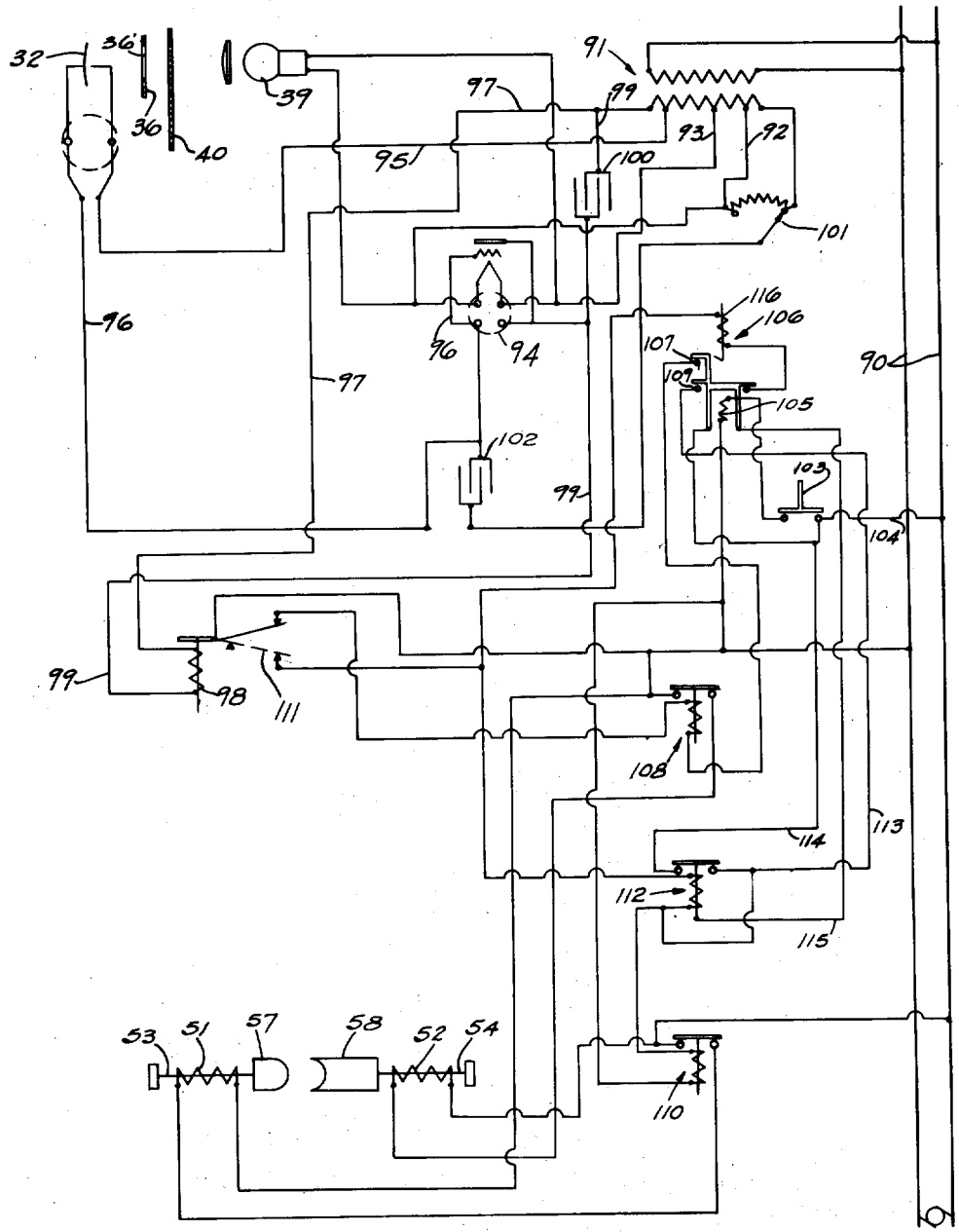
Fig. IX

Patented Feb. 4, 1936

2,029,903

UNITED STATES PATENT OFFICE 2,029,903

WEIGHING SCALE

Mark A. Weckerly, Toledo, Ohio, assignor to Toledo Scale Manufacturing Company, Toledo, Ohio, a corporation of New Jersey Application July 27, 1932, Serial No. 624,946

12 Claims. (Cl. 249—64)

This invention relates generally to weighing scales, and more particularly to weighing scales which are adapted to determine successively a large number of loads of equal predetermined weight and to means associated therewith for controlling a feed stream of such material.

Scales of this type are widely employed in packing commodities such as coffee, sugar, flour, cereals, spices and other similar materials. The principal object of this invention is the provision of means whereby the illumination of a photoelectric element affects one operation, the subsequent diminishing of light falling upon said element affects another operation and the subsequent replenishment of light to said element affects a third operation.

Another object is the provision of means whereby the loading of a weighing scale causes light falling upon a photoelectric element to be diminished and thereby diminishes the rate of said loading, and subsequent loading again admits more light to the photoelectric element and consequently terminates said loading.

Another object of the invention is the provision of improved means for cutting off a feed stream of material when the predetermined amount has been deposited on the commodity-receiver.

Another object is the provision of improved means for controlling the rate of flow of such commodity.

Another object is the provision of photoelectric means to effect such control.

Still another object is the provision of a single photoelectric element for controlling the amount of commodity being deposited per unit of time.

Still another object is the provision of improved means for successively controlling two parts of a single material feed gate by means of a photoelectric element.

And still another object is the provision of an improved method of electrically connecting the component parts required in the embodiment of this invention.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a front elevational view of a weighing scale embodying my invention and part of an associated material feeding means.

Figure II is an enlarged side elevational view thereof.

Figure III is an enlarged fragmentary view of the indicating and control means.

Figure IV is an enlarged side elevational view thereof, parts broken away and showing photoelectric control elements in detail.

Figure V is an enlarged plan view of the indicating means housing, showing in detail the method of supporting the light source.

Figure VI is an enlarged sectional plan view of a material feeding gate and operating mechanism forming a part of my device, sectioned substantially along the line VI—VI of Figure VII.

Figure VII is an enlarged side sectional view therethrough sectioned substantially along the line VII—VII of Figure VI.

Figure VIII is an enlarged cross-sectional view substantially along the line VIII—VIII of Figure VII; and Figure IX is a wiring diagram of electrical circuits employed in my device.

As the scale in which I have incorporated the embodiment of my invention is fully described and disclosed in U. S. Patent No. 1,857,278 to H. O. Hem and as reference thereto may be readily had, I will describe it only insofar as is necessary to fully disclose my invention.

Referring to the drawings in detail, the scale mechanism is supported by a base 1 equipped with leveling legs 2 which are adapted to rest upon a counter or stand 3. Brackets 4 extend upwardly from the base 1 and carry bearings 5 in bifurcations. These bearings support fulcrum pivots 6 of a main scale lever 7. The main scale lever is of the even arm type and each end thereof has laterally extending pivots 8 which support load and counterbalance platter spiders 9 and 10, respectively. A plurality of posts 11 and 12 which are studded into the upper portions of the spiders project through a casing 13 which completely houses and protects the lever mechanism. The posts 11 support on their upper ends a commodity-receiver 14, preferably in the form of a grid so that spilled commodity will not accumulate thereon and cause errors in weighing results. The posts 12, projecting from the counterbalance weight receiver spider 10, support a counterbalance weight platter 15. To maintain the condition of level of the load and counterbalance receivers, a check link 16, of well known form, is provided.

An auxiliary lever 17 with posts 18 is oscillatably mounted on suitable bearings in a bracket 19 which projects upwardly from the base 1 and is connected by means of a link 17' to the main lever 7. The opposite end of the auxiliary lever is equipped with a nose pivot 20 which engages a stirrup 21 suspended from a flexible metallic tape or ribbon 22 whose upper end overlies and is fastened to an arcuate surface of a power sector 23. This sector is one of the component parts of a load-counterbalancing pendulum 24. This pendulum 24 is mounted by means of a pivot 25 on suitable bearings (not shown) in a vertically extending housing 26 which surmounts the casing 13. The pendulum 24 also comprises an indicating hand 27 and a pendulum weight 28 which is adjustably mounted on the stem 29 for co-operation with the indicating hand 27. To indicate the condition of equilibrium of the weighing mechanism, a chart 30 is stationarily fixed in the upper end of the housing 26 and bears a zero indicium 31.

The scale thus far described is a very efficient and sensitive weighing device.

In carrying out my invention I mount a photoelectric element 32 substantially in a plane, perpendicular to the chart passing through the zero indicium 31, the element being immediately below the indicium. The element is enclosed within a tubular enclosure 33 which projects upwardly through an aperture into an enlargement 34 on the back of the housing 26. A threaded stem 35 is riveted to the upper wall of the enclosure 33 and projects through a boss in the enlargement 34, to which the enclosure 33 may be clamped by means of a knurled nut 35'. A horizontal tube 36, with a closed outer end, projects from the enclosure 33. The closed end of the tube is positioned under the chart 30. A narrow, slit-like aperture 36' is cut in the closed end of the tube. This aperture is the only opening for light to enter the enclosure 33 and illuminate the photoelectric element 32. Studded into an enlarged head on the stem 35 is a bail-like member 37, formed so as to straddle the housing 26 and having a free arm extending in front of the housing 26 to which a light source assembly 38 is fastened. This assembly comprises an electric light 39, a light-proof cell 40 and suitable means (not shown) for retaining the electric light within the cell and connecting it to a source of electricity. Since the light source is mounted on the bail-like member 37 which is rigidly studded into the stem 35, any adjustment which is made in the position of the enclosure 33 does not affect the relative positions of the light source, the slit-like aperture and the photoelectric element. Hence, in all positions of adjustment the light from the lamp 39 will shine upon the photoelectric element through the slit 36' unless intercepted by an independent member.

For a purpose which will hereinafter be more fully described, the indicator hand 27 is provided with a paddle-like extension 41. The terminal edges of this paddle, when extended downwardly, intersect each other at the axis of oscillation of the indicator.

The material cut-off gate, which is controlled by the photoelectric element in conjunction with the scale, is assembled upon a mechanism plate 45 (Figures VII and VIII), which, in the embodiment herein shown and described, is provided with an angularly extending ear 46 bolted to an upright frame 47 fastened to the base 1 and braced to the housing 26. Located centrally in the plate is an aperture in which a comparatively short piece of tubing 48 is stationed. Integrally depending bosses 49 and 50 are provided adjacent the ends of the plate and to these plates solenoid coils 51 and 52 are fastened in substantially horizontal positions. Armatures 53 and 54 are floatingly positioned in the coils. The heads of the armatures are connected by means of pintles 55 and 56, respectively, to cut-off slides 57 and 58. Horizontally disposed ways for the slides are fastened by screws 61 and 62 to bosses 59 and 60 projecting downwardly from the plate 45. These ways comprise comparatively narrow plates 63 and spacers 64, their thickness being slightly greater than the thickness of the slides 57 and 58 so that the slides may slide freely yet without excessive freedom and, when covering the opening, efficiently and completley cut off a material feed stream passing through the tube. The pintles 55 and 56 also retain yoke-like members 65 and 66. Each arm of the yokes engages an end of one of a pair of coil springs 67 and 68. The other ends of these springs are fastened to studs 69 and 70, respectively, adjustably threaded through apertures in flanges 71 and 72 depending from the plate 45. Bosses 73 and 74 project laterally from the flanges 71 and 72 and are adapted to receive screws 75 and 76 which pass through the end plates of the solenoid coils 51 and 52 to help to hold them rigid. A slot 77, through which a stop finger 78 extends, opens through the plate 45. The finger 78 may be locked in any desired position within the slot by a knurled thumb screw 79. This finger is for the purpose of limiting the movement of the armature 54 of the solenoid 52. The mechanism attached to the plate 45 is completely enclosed by a cover 80 in which a tube 81 is fastened, which, when the cover is attached to the plate, is co-axial with the tube 48. Plug portions 82 of separable connectors are also mounted on the plate 45 so that the proper electrical energy may be supplied to the coils. A flow equalizing funnel 83 surmounts the tube 48. A second and larger flow equalizing funnel 84 is attached to the top of the frame 47 and receives material delivered through a spout 85 from a material supply bin (not shown).

To enable the operator of the machine, according to the invention, to check the relative positions of the indicator hand 27 and the indicium on the chart at the moment of and immediately after cut off when facing the end of the device, which is the most convenient operating position, a reflecting mirror 86 is secured by means of an arm 87 to the housing 26 (see Figure II). This enables the operator to tell at a glance whether the amount of material delivered is of the predetermined weight without checking it on a separate weighing device. To render the reflected wording readable in the mirror, the reading is printed reversely on the chart (see Figure III).

The commodity-receiver 14 carries, by means of a frame 88, a chute 89 which is stationed immediately below the tube in the cut-off mechanism. In operation, the empty bag is opened and the open end slipped about the chute 89, which prevents the bag from tipping over while the material is flowing into it.

Current is supplied to the apparatus from the usual utility circuit 90 which is connected to one side of a transformer 91. Leads 92 and 93, tapped into the other side of the transformer, conduct current at proper voltage to the lamp 39. The leads 92 and 93 are also connected to the filament of a thermionic tube 94, while another lead, 95, connects the transformer with one side of the photoelectric element 32, the other side of which is connected by means of a wire 96 to the grid of the thermionic tube. Hence, when the lamp 39 is lighted and light therefrom passing through the slit 36' illuminates the photoelectric element, thereby increasing its ability to pass current, current passes from the transformer through the lead 95, the photoelectric element 32 and the wire 96 to the grid of the thermionic tube 94, thereby varying the relative potentials of the grid and filament to the tube.

Current is supplied to the plate of the thermionic tube through the connection 97, the actuating coil of the relay 98 and the connection 99.

Hence, when the photoelectric element is activated by an increase in its illumination, the current passing through the actuating coil of the relay 98 is increased in amplified degree. In order that the energy of the actuating coil of the relay 98 may be properly sustained, a condenser 100 is interposed in the connection 99 which connects the actuating coil of the relay 98 with the transformer 91. The grid potential of the thermionic tube may be manually adjusted by means of a potentiometer 101 connected through a smoothing condenser 102 to the wire 96 which leads from the photoelectric element to the grid. The potentiometer may be so adjusted that the current passing through the actuating coil of the relay 98 when the photoelectric element is illuminated is sufficient to actuate the relay 98, but the current passing through the coil when the illumination of the photoelectric element is cut off is insufficient to actuate the relay. The potentiometer adjustment makes it possible readily to compensate for variations in light conditions and in characteristics of photoelectric elements and thermionic tubes.

With a counterbalance of the weight required to offset the weight of a properly filled package upon the counterbalance weight platter 15, the potentiometer 101 being properly adjusted, the photoelectric element 32 being illuminated and, consequently, the relay 98 being in the position indicated in Figure IX, operation of the device is started by manually pressing a starter button or switch 103. The starter button completes a circuit from the utility line 90 through a lead 104 and a setting coil 105 of a mechanically latched three-pole electric reset relay 106. When the setting coil 105 is actuated and the circuit completed through the pole 107 and the relay 98 in the position in which it is shown in Figure IX, a fast feed relay 108 is closed, thereby activating the solenoid 52, which moves the slide 58 to its open position. At the same time a circuit completed through the pole 109 closes a slow feed relay 110, thereby actuating the solenoid 51, which acts to open the slow feed slide 57. Opening of the slides 58 and 57 permits rapid flow of material through the spout 85, the flow equalizing funnels 84 and 83 and the chute 89 into a package on the commodity-receiver 14.

The counterbalance weight, acting through the lever mechanism and the ribbon 22, holds the pendulum 29 in elevated position and the indicator 27 in the position in which it is shown in Figures I and III. As the weight of the commodity being deposited upon the commodity-receiver approaches the weight of the counterpoise on the platter 15, the pendulum 24 begins to descend and the paddle-like extension 41 moves toward the slit 36' until the slit is eclipsed and the light reaching the photoelectric element 32 from the lamp 39 is cut off, thus varying the grid potential of the thermionic tube 94 and deenergising the actuating coil of the relay 98. Deenergizing the actuating coil of the relay 98 opens the circuit which has energized the activating coil of the relay 108, thus causing the relay 108 to open and deenergize the solenoid 52, so that the fast feed slide 58 is drawn partially over the opening at the lower end of the tube 48 by means of the spring 68, reducing the flow of commodity to a "dribble stream".

Deenergization of the actuating coil of the relay 98 closes at 111 a circuit through the actuating coil of relay 112, which, in turn, closes a circuit through connections 113 and 114 and the actuating coil of the relay 110. Closing of the relay 112 also completes a circuit through connection 115 et al. to the reset coil 116 of the reset relay 106. Energization of the reset coil 116 opens all three poles of the reset relay, thus deenergizing the reset coil 116. The relay 110 remains closed, however, under the influence of the current passing through the contacts of the relay 112.

Under the influence of the load, which, augmented by the dribble stream, continues to accumulate slowly on the commodity-receiver, the paddle-like extension 41 swings with reduced speed over the slit 36' until the slit is again uncovered and light is again admitted from the lamp 39 to the photoelectric elements. The resulting increase in current passed by the photoelectric element, amplified by the thermionic tube, again energizes the actuating coil of the relay 98, opening at 111 the circuit energizing the coil of the relay 112, thereby deenergizing the actuating coil of the relay 110 and breaking the circuit by which the slow feed solenoid 51 was energized, so that the slow feed slide 57 is pulled by the coil spring 67 into engagement with the end of the fast feed slide 58 to completely close the lower end of the tube 48 and cut off the dribble stream.

Removal of the package from the commodity-receiver causes the indicator hand and paddle-like extension to return to the positions in which they are shown in Figure I and the circuits to return to the condition in which they were just previous to the pressing of the starter button 103 at the beginning of the filling operation. The apparatus is, therefore, ready for another filling operation.

The size of the dribble stream may be regulated by positioning the stop finger 78 and the effect of the commodity in suspension at the closing of the slow feed slide and other inertia forces may be accurately compensated for by turning the stem 35 with the horizontal tube 36, the bracket 37 and the light source assembly 38 about the axis of the stem 35, thereby shifting the slit 36' slightly relative to the indicium on the chart.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, a photoelectric element, weighing mechanism, means connected to said weighing mechanism for changing the amount of light supplied to said photoelectric element and subsequently changing the amount of light to substantially the amount formerly supplied to said photoelectric element, a relay circuit controlled by the first change in the amount of light supplied to said photoelectric element, and a second relay circuit controlled by the subsequent change in the amount of light supplied to the photoelectric element.

2. In a device of the class described, in combination, fast material feeding means, slow material feeding means, weighing mechanism, a photoelectric element, means for causing a variation in the amount of light supplied to said photoelectric element, means operatively connecting said light varying means to said weighing means, means whereby a variation in the amount of light supplied to said photoelectric element affects the operation of said fast feed means, and means whereby a subsequent variation in the amount of light supplied to said photoelectric element affects the operation of said slow feed means.

3. In a device of the class described, in combination, weighing mechanism, a photoelectric element, fast material feeding means, slow material feeding means, an indicating hand operatively connected to said weighing mechanism and controlling said photoelectric element, and means controlled by said photoelectric element whereby the position of said indicating hand affects successively the operation of said fast material feeding means and said slow material feeding means.

4. In a device of the class described, in combination, weighing mechanism, a photoelectric element in operative relation thereto, fast material feeding means, slow material feeding means, a shield having a slit therein, said photoelectric element being stationed behind said shield, a light source stationed in front of said slit and adapted to illuminate said photoelectric element, and a movable member having substantial width actuated by said weighing mechanism, said movable member being adapted to successively cover said slit and uncover it during operation of said weighing mechanism and electrical connections between said photoelectric element and said feeding means whereby such successive covering and uncovering successively affects the operation of said fast material feeding means and said slow material feeding means.

5. In a device of the class described, in combination, weighing mechanism having a shield connected thereto, auxiliary mechanism control means, said auxiliary mechanism control means comprising a photoelectric element, an enclosure therefor, said enclosure having an aperture adapted to be successively covered and uncovered by said shield, and relay circuits successively actuated by the covering and uncovering of said aperture.

6. In a device of the class described, in combination, weighing mechanism and material feeding means adapted to feed material at different rates in cooperative relation thereto, said weighing mechanism comprising a load-receiver, a load-counterbalancing mechanism actuated from said load-receiver, an indicating member controlled by said load-counterbalancing mechanism, photoelectric means in controlling relation to said material feeding means, said photoelectric means comprising a light sensitive element, a cover for said element, an aperture in said cover adapted to illuminate said element, said indicating member covering said aperture in said light sensitive element cover when a predetermined amount of material has been delivered by said material feeding means on said load-receiver whereby the rate of delivery is affected and said indicating member subsequently uncovering said aperture when such material on said load-receiver reaches a second predetermined amount whereby the rate of delivery is again affected.

7. In a device of the class described, in combination, weighing mechanism having an indicium bearing chart and pivoted hand, material feeding means in operative relation to said weighing mechanism, photoelectric means for controlling said material feeding means and being controlled by said weighing mechanism, said pivoted hand having a laterally extending projection to darken said photoelectric means throughout a predetermined angle of movement of said indicator hand and then readmit light to said photoelectric means upon further movement of said hand in the same direction, and means connecting said photoelectric means to said material feeding means for affecting the operation of said material feeding means first upon the darkening of said photoelectric means and again upon the reillumination of said photoelectric means.

8. In a device of the class described, in combination, a weighing device, a material feeder, said feeder comprising a housing, and a divided tube extending therethrough, magnetically actuated slides having opposed movement adapted to extend into the divisions of said tube, a magnetic coil for each of said slides, a single electric element cooperating with said weighing mechanism, and means controlled by said element including a mechanically latched three-pole electric reset relay for moving said slides successively into the divisions of said tube.

9. In a device of the class described, in combination, a weighing device, a material supply means including a material feeder for delivering material to said weighing device, an electric control element controlled by said weighing device, said material feeder comprising a material feed tube, a plurality of slides having opposed reciprocatory movement, solenoid coils for operating said slides, electrical means including a manually actuated starting switch for energizing said solenoid coils and moving said slides in opposed directions, means controlled by said electric control element for successively deenergizing said solenoid coils, and resilient means for moving said slides in directions opposite to the directions of said first mentioned movements.

10. In a device of the class described, in combination, weighing mechanism, a material supply means for feeding such material to said weighing device, a photoelectric element controlled by the weight of such material on said weighing mechanism for controlling said feeding means, said feeding means comprising a tube, a plurality of horizontally movable slides controlled by said photoelectric element for closing said tube, and means for obtaining successive movements of different magnitude for each of said slides.

11. In a device of the class described, in combination, weighing mechanism, a material supply means including means for feeding such material to said weighing device, a photoelectric element controlled by the weight of such material on said weighing mechanism for controlling said feeding means, said feeding means comprising a tube, a plurality of horizontally movable slides, means whereby said slides are controlled by said photoelectric element for closing said tube, and a manually adjustable stop in the path of one of said slides for obtaining successive movements of different magnitude for each of said slides.

12. In a device of the class described, in combination, a photoelectric element, weighing mechanism, means connected to said weighing mechanism for changing the amount of light supplied to said photoelectric element and subsequently again changing the amount of light supplied to said photoelectric element, means controlled by the first change in the amount of light supplied to said photoelectric element to control the operation of certain mechanism, and means controlled by the subsequent change in the amount of light supplied to said photoelectric element to control the operation of other mechanism.

MARK A. WECKERLY.